(12) United States Patent
Chow et al.

(10) Patent No.: US 6,753,106 B2
(45) Date of Patent: *Jun. 22, 2004

(54) METHOD AND APPARATUS FOR DISTRIBUTING WATER IN AN ARRAY OF FUEL CELL STACKS

(75) Inventors: Clarence Y.F. Chow, Vancouver (CA); John Ka Ki Chan, Vancouver (CA); Adrian James Corless, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 110 days.

This patent is subject to a terminal disclaimer.

(21) Appl. No.: 10/003,160

(22) Filed: Oct. 31, 2001

(65) Prior Publication Data

US 2002/0041984 A1 Apr. 11, 2002

Related U.S. Application Data (63) Continuation of application No. 09/322,871, filed on May 28, 1999, now Pat. No. 6,322,914, which is a continuation-in-part of application No. 08/980,496, filed on Dec. 1, 1997, now Pat. No. 5,935,726.

(51) Int. Cl.[7] .......................... H01M 8/04; H01M 8/24
(52) U.S. Cl. ..................... 429/13; 429/22; 429/26
(58) Field of Search .................... 429/13, 22, 32, 429/26

(56) References Cited

U.S. PATENT DOCUMENTS

| | | | |
|---|---|---|---|
| 3,553,023 A | 1/1971 | Doyle | |
| 4,243,731 A | 1/1981 | Cheron | 429/13 |
| 4,476,197 A | 10/1984 | Herceg | 429/32 |
| 4,582,765 A | 4/1986 | Kothmann | 429/34 |
| 5,486,430 A | 1/1996 | Gorbell et al. | 429/35 |
| 5,518,705 A | 5/1996 | Buswell et al. | 423/437 |
| 5,543,238 A | 8/1996 | Strasser | 429/17 |
| 5,601,936 A | 2/1997 | Dudfield et al. | 429/13 |
| 5,677,073 A | 10/1997 | Kawatsu | 429/22 |
| 5,935,726 A | 8/1999 | Chow et al. | 429/13 |
| 6,063,516 A | 5/2000 | Grot et al. | 429/22 |
| 6,322,914 B1 * | 11/2001 | Chow et al. | 429/13 |

FOREIGN PATENT DOCUMENTS

| | | | |
|---|---|---|---|
| DE | 19813339 | 10/1999 | H01M/8/06 |
| EP | 0 692 835 A2 | 1/1996 | H01M/8/04 |
| JP | 4-306566 | 10/1992 | H01M/8/04 |
| JP | 7-272738 | 10/1995 | H01M/8/04 |
| WO | WO 96/20509 | 7/1996 | H01M/8/24 |

* cited by examiner

*Primary Examiner*—Stephen J. Kalafut
(74) *Attorney, Agent, or Firm*—McAndrews, Held & Malloy, Ltd.

(57) ABSTRACT

A method and apparatus are provided for distributing water produced by the electrochemical reaction to ion-exchange membranes in an array comprising a plurality of electrochemical fuel cell stacks. Water distribution within individual fuel cell stacks within the array is improved to reduce membrane dryness near the oxidant stream inlet and to also reduce saturation of the oxidant stream near the oxidant stream outlet, thereby reducing electrode flooding. The method comprises periodically reversing the oxidant stream flow direction within at least one of the plurality of fuel cell stacks. The apparatus comprises an oxidant stream flow switching device for periodically switching the flow direction of an oxidant stream through an individual fuel cell stack. In one embodiment the apparatus further comprises a water recycler for capturing water from the oxidant exhaust stream and returning the captured water to the oxidant stream when the flow direction is reversed. In a preferred embodiment, the oxidant stream flow direction in an array of fuel cell stacks is controlled to stagger the oxidant flow reversals for individual stacks to reduce fluctuations in power output.

14 Claims, 5 Drawing Sheets

METHOD AND APPARATUS FOR DISTRIBUTING WATER IN AN ARRAY OF FUEL CELL STACKS

CROSS REFERENCE TO RELATED APPLICATIONS

This application is a continuation of U.S. patent application Ser. No. 09/322,871 filed May 28, 1999, entitled "Method and Apparatus for Distributing Water to an Ion-Exchange Membrane in a Fuel Cell", now U.S. Pat. No. 6,322,914 issued Nov. 27, 2001, which is a continuation-in part of U.S. patent application Ser. No. 08/980,496 filed Dec. 1, 1997, entitled "Method and Apparatus for Distributing Water to an Ion-Exchange Membrane in a Fuel Cell", now U.S. Pat. No. 5,935,726 issued Aug. 10, 1999. The '496 and '871 applications are incorporated herein by reference in their entireties.

FIELD OF THE INVENTION

The present invention relates to an array of solid polymer electrochemical fuel cell stacks. Typically ion-exchange membranes in such fuel cells must be kept moist to enhance their ionic conductivity and reduce physical degradation resulting in structural failure and leaks. A method and apparatus are provided for utilizing water produced by the electrochemical reaction to keep the ion-exchange membrane moist. More particularly, the present invention improves water management in an array of fuel cell stacks by periodically reversing the reactant flow direction in at least one fuel cell stack.

BACKGROUND OF THE INVENTION

Electrochemical fuel cells convert fuel and oxidant fluid streams to electricity and reaction product. Solid polymer electrochemical fuel cells generally employ a membrane electrode assembly ("MEA") comprising a solid polymer electrolyte or ion-exchange membrane disposed between two porous electrically conductive electrode layers. An electrocatalyst is typically disposed at each membrane/electrode layer interface to induce the desired electrochemical reaction.

In typical fuel cells, the MEA is disposed between two electrically conductive separator plates. A fluid flow field provides a means for directing the fuel and oxidant to the respective electrocatalyst layers, specifically, at the anode on the fuel side and at the cathode on the oxidant side. A simple fluid flow field may consist of a chamber open to an adjacent porous electrode layer with a first port serving as a fluid inlet and a second port serving as a fluid outlet. The fluid flow field may be the porous electrode layer itself. More complicated fluid flow fields incorporate at least one fluid channel between the inlet and the outlet for directing the fluid stream in contact with the electrode layer or a guide barrier for controlling the flow path of the reactant through the flow field. The fluid flow field is commonly integrated with the separator plate by locating a plurality of open-faced channels on the faces of the separator plates facing the electrodes. In a single cell arrangement, separator plates are provided on each of the anode and cathode sides. The plates act as current collectors and provide structural support for the electrodes.

The fuel stream directed to the anode by the fuel flow field migrates through the porous anode and is oxidized at the anode electrocatalyst layer. The oxidant stream directed to the cathode by the oxidant flow field migrates through the porous cathode and is reduced at the cathode electrocatalyst layer.

Solid polymer fuel cells generally use fuels, such as, for example, hydrogen or methanol, which are oxidized at the anode to produce hydrogen cations. The hydrogen cations migrate through the ion-conducting electrolyte membrane and react with an oxidant such as oxygen in air at the cathode to produce water as one of the reaction products. The anode and cathode reaction equations in hydrogen/oxygen fuel cells are believed to be as follows:

Anode reaction:  $H_2 \rightarrow 2H^+ + 2e^{3_1}$

Cathode reaction:  $\frac{1}{2}O_2 + 2H^+ + 2e \rightarrow H_2O$

Water in the ion-exchange membrane facilitates the migration of protons from the anode to the cathode. The membrane is electrically non-conductive and also serves as a barrier to separate the hydrogen-containing fuel stream from the oxygen-containing oxidant stream.

The electrons produced at the anode induce an electrical current through an external circuit or load from the anode to the cathode.

Because water is produced by the cathode reaction, as the oxidant stream travels through the oxidant flow field, the oxidant stream absorbs product water. The product water is absorbed as water vapor until the oxidant stream becomes saturated; additional product water may be carried in the oxidant stream as entrained water droplets.

The cumulative effect of product water absorption into the oxidant stream causes the flow field region near the oxidant flow field outlet to contain more water than the flow field region closer to the oxidant stream inlet. Therefore, the fresh oxidant stream typically enters the oxidant flow field at its driest region. If the oxidant stream entering the oxidant flow field is not adequately humidified, the oxidant stream may absorb water from the membrane in the region nearest the oxidant stream inlet.

It is generally well known that most conventional fuel cell ion-exchange membranes must be kept moist to maintain adequate ionic conductivity and to reduce structural damage that may result if the membrane is allowed to become too dry. It is known that leaks in membranes frequently occur near reactant stream inlet ports. Such leaks may be caused or contributed to by inlet streams drying the membrane, resulting in the formation of cracks or holes.

Accordingly, in the prior art, it is known to provide means for keeping the membrane wet and/or humidifying the reactant streams before they enter the flow fields. A disadvantage of conventional methods of humidifying the reactant streams is that incorporating an external humidification apparatus adds to the system complexity and reduces the overall system efficiency.

The production of water at the cathode may cause another problem if too much water accumulates in the oxidant flow field. If the oxidant stream becomes saturated, two phase flow may occur, that is, the oxidant stream may contain water vapor and liquid water droplets. Liquid water in the oxidant flow field can "flood" the porous electrode and obstruct the oxidant from reaching the cathode electrocatalyst. Saturation and flooding is more likely to occur in the portions of the oxidant flow field closest to the outlet, where the oxidant stream has had the most opportunity to accumulate product water.

In view of the above-identified problems, overly wet or dry regions of the flow field can detrimentally affect fuel cell performance and accelerate the degradation of performance over time. Fuel cell performance is defined as the voltage output from the cell for a given current density; higher performance is associated with higher voltage for a given current density. Accordingly, there is a problem with conventional fuel cells that have localized wet and dry regions caused by the cumulative effect of reaction product water absorption into the oxidant stream.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is typically held together in its assembled state by tie rods and end plates.

As with single cell fuel cell assemblies, in a fuel cell stack where fixed inlets and outlets are typically used for supplying and exhausting reactants, the accumulation of product water in the oxidant flow fields causes similar localized wet and dry conditions in each individual fuel cell of the stack. Consequently, at the inlets near the stack oxidant supply manifolds, the membranes can become overly dry, while the oxidant stream can become saturated near the outlets to the stack oxidant exhaust manifolds.

A fuel cell array typically comprises a plurality of fuel cell stacks that may be electrically connected in series or in parallel. The reactants are typically supplied in parallel to the individual fuel cell stacks in the array. As with an individual fuel cell assembly or a fuel cell stack, water management issues are encountered in conventional fuel cell arrays.

Accordingly, it is an object of the present invention to provide a method and apparatus for managing product water and distributing water to an ion-exchange membrane in an electrochemical fuel cell, which may be one of a plurality of fuel cells in a fuel cell stack or a fuel cell array.

SUMMARY OF THE INVENTION

In the present method, water accumulating in an oxidant stream is distributed in an array comprising a plurality of electrochemical fuel cell stacks. The plurality of fuel cell stacks each comprise at least one fuel cell assembly comprising an ion-exchange membrane interposed between a cathode and an anode. Each fuel cell assembly preferably further comprises:

an oxidant flow field associated with the cathode for directing the oxidant stream to the cathode between a first oxidant flow field port and a second oxidant flow field port; and a fuel flow field associated with the anode for directing a fuel stream to the anode between a fuel stream inlet port and a fuel stream outlet port.

In one embodiment, the method comprises utilizing water accumulating in an oxidant stream flowing through the plurality of fuel cell stacks by periodically reversing the oxidant stream flow direction within oxidant passages within at least one, and preferably each, of the plurality of fuel cell stacks in the array. Preferably, the oxidant stream flow direction is periodically reversed in each of the stacks in the array.

Reversing the flow direction of a reactant within a fuel cell stack may cause certain transition effects. In some circumstances (for example, during operation on dilute reactant streams) reversing the reactant flow direction may cause a small amount of depleted reactant stream to be directed back through the reactant passages causing a momentary decrease in power output, that is, until fresh reactant entering the fuel cell stack is introduced to the passages. Several methods may be employed to reduce such transition effects. For example, it is desirable to locate the flow switching device as close as possible to the fuel cell reactant ports to reduce the amount of depleted reactant that is re-directed back through the fuel cell stack when the reactant flow direction is reversed. It is also desirable for the flow switching device to employ valves that may be quickly and precisely controlled. Another approach is to increase the reactant stoichiometry immediately prior to reversing the reactant stream flow direction.

To further reduce transition effects resulting from reversing the oxidant stream flow direction, preferably the oxidant stream flow direction in an array is controlled so that the flow direction within every one of the plurality of stacks is not reversed simultaneously. That is so that there is at least one stack that is not undergoing oxidant stream flow reversal at any given moment. The oxidant stream flow direction within each one of the plurality of fuel cell stacks may be periodically sequentially reversed at staggered intervals. For example, the flow direction reversals may be sequenced so that the oxidant stream flow direction is not reversed simultaneously in any pair of said plurality of fuel cell stacks. By controlling the relative timing of the flow reversals in stacks in the array, the transition effects are reduced.

An additional method of reducing the impact of transition effects is to control the periodic reversals in the oxidant stream flow direction so that they occur when power output of the array is below a threshold value. In this way, transition effects do not limit power output when peak power output is demanded.

In a preferred embodiment, the disclosed method further comprises controlling the temperature profile within the oxidant stream so that the oxidant stream temperature generally increases in the flow direction. This aspect of the method may be advantageously applied to an array of fuel cell stacks, or to an individual fuel cell stack or fuel cell assembly, that is not part of an array. An advantage of controlling the oxidant stream temperature so that the oxidant stream is cooler where it enters the fuel cell, compared to where it exits the fuel cell is improved water management. As the oxidant stream flows through the fuel cell it is exposed to more product water. Accordingly, if the oxidant stream temperature also rises as it flows through the fuel cell, the water carrying capacity of the oxidant stream also increases. Therefore, when the flow direction of the oxidant stream is periodically reversed, it is advantageous to correspondingly adjust the cooling system so that the temperature profile in the oxidant stream generally increases in the flow direction. In addition to improved handling of product water, reducing the temperature and water carrying capacity of the oxidant stream near the oxidant inlet also helps to prevent membrane dehydration by preventing the oxidant stream from carrying too much water away from the membrane near the oxidant inlet.

In one embodiment, to assist in controlling the temperature profile of the oxidant stream, the coolant fluid flow direction is also controlled so that it is substantially concurrent with the oxidant stream flow direction. Accordingly, a coolant fluid flow field is provided which has inlet/outlet ports which are in the same general location relative to the MEA as the oxidant stream inlet/outlet ports; the coolant fluid flow direction through the coolant flow field is periodically reversed substantially simultaneously with the change in oxidant stream flow direction so that the oxidant and coolant streams flow in substantially the same direction within a fuel cell assembly.

In another preferred embodiment, the method further comprises releasably capturing water from the oxidant stream downstream of at least one of the plurality of fuel cell stacks in the array. At least a portion of the captured water is released back into the oxidant stream upstream of at least one of the plurality of fuel cell stacks. For example, when the oxidant stream flow direction is reversed, the oxidant flow field port previously serving as the outlet becomes the inlet, and at least a portion of the captured water is released into the fresh oxidant stream that is introduced through the port/inlet into the oxidant flow field.

To further improve water management within the array, in a preferred embodiment, the method further comprises periodically reversing the flow direction of a fuel stream substantially simultaneously with the flow direction reversals of the oxidant stream that flows on the opposite side of the same fuel cell membrane. The fuel stream flow direction is reversed to prevent the fuel stream flow direction from being substantially concurrent with the oxidant stream flow direction. The advantage of this technique is that it prevents the oxidant and fuel streams from entering the fuel cell in the same general location with respect to the membrane. When the oxidant and/or fuel supply streams are not adequately humidified, preventing the oxidant and fuel streams from flowing in a substantially concurrent direction reduces membrane drying effects near the oxidant and fuel supply stream inlets by keeping such inlet locations spaced apart. Therefore, in this embodiment, the fuel stream is preferably directed to flow in a direction substantially opposite to the oxidant stream flow direction. Advantageously, the portion of the oxidant flow field near the oxidant outlet, that is typically the most humidified portion of the oxidant flow field, is opposite the portion of the fuel flow field near the fuel inlet, thereby offsetting membrane drying that may result from the introduction of an inadequately humidified fuel stream.

Also provided is a method of distributing water in an array comprising a plurality of electrochemical fuel cell stacks utilizing water in a fuel stream flowing through the plurality of fuel cell stacks. In this embodiment, the fuel stream flow direction is periodically reversed within fuel passages within at least one, and preferably each, of the plurality of fuel cell stacks. Since water is not a product of the induced anode-side reaction, the fuel supply stream is preferably humidified prior to being introduced into a fuel cell assembly. In this method, some water may also migrate from the cathode to the anode, supplementing any humidification water present in the fuel stream. The fuel stream flow direction is periodically reversed for better distribution of the humidification water and/or the migration water to the fuel cell membrane. A fuel flow field associated with the anode may be employed to direct the fuel stream to the anode between a first fuel flow field port and a second fuel flow field port.

Conventional fuel cell assemblies, fuel cell stacks, and arrays have not utilized the fuel stream to distribute water to the fuel cell membrane because efforts relating to solving water management problems have generally been directed to the cathode side where water is a product of the induced reactions, and it is on the cathode side where water "flooding" is typically observed. Some conventional fuel cell systems have humidified the fuel stream prior to introducing it to a fuel cell assembly, but it has not been suggested to reverse the fuel stream flow direction in a fuel cell assembly to improve the distribution of water to the membrane. Reversing the fuel stream flow direction is a technique which may be employed alone or in combination with other techniques, including those described herein, to reduce or eliminate the humidification pretreatment requirements for one or both of the oxidant and fuel streams supplied to a fuel cell assembly.

As with the oxidant stream, it is desirable to reduce the impact of transition effects caused by reversing the flow direction of a reactant stream. Again, preferably the fuel stream flow direction in an array is controlled so that the flow direction within every one of the plurality of stacks is not reversed simultaneously. That is so that there is at least one stack that is not undergoing fuel stream flow reversal at any given moment. The fuel stream flow direction within each one of the plurality of fuel cell stacks may be periodically sequentially reversed at staggered intervals. For example, the flow direction reversals may be sequenced so that the fuel stream flow direction is not reversed simultaneously in any pair of said plurality of fuel cell stacks. Other techniques described above which may be used to reduce the transition effect caused by reversing the oxidant stream may also be adapted to reduce the transition effects when reversing the fuel stream. For example, the periodic reversals in the fuel stream flow direction may be controlled so that they occur when power output of the array is below a threshold value.

The method may further comprise periodically reversing the flow direction of a coolant fluid flowing through at least one, and preferably each, of the plurality of fuel cell stacks. The coolant flow direction is preferably controlled so that the reactant stream that is the primary carrier of membrane hydration water has a temperature profile that generally increases in the direction of flow.

In a single fuel cell or fuel cell stack, the flow direction of a substantially poison-free fuel stream through the fuel cell(s) may be advantageously periodically reversed, to distribute water to an ion-exchange membrane in the fuel cell. Preferably the fuel supply stream is humidified prior to being introduced into the fuel cell, so that a source of the membrane hydration water is humidification water as well as water which has migrated through the membrane from the cathode to the anode. As with the other embodiments, this method may further comprise periodically reversing the flow direction of a coolant fluid flowing through the fuel cell.

Also provided is an electrochemical fuel cell assembly comprising an ion-exchange membrane interposed between a cathode and an anode. The assembly further comprises:

an oxidant flow field associated with the cathode for directing an oxidant stream to the cathode between a first oxidant flow field port and a second oxidant flow field port;

a fuel flow field associated with the anode for directing a fuel stream to the anode between a fuel stream inlet port and a fuel stream outlet port;

a coolant system comprising at least one coolant passage associated with the fuel cell for receiving a coolant fluid which flows through the at least one coolant passage;

an oxidant stream flow switching device for periodically reversing the direction of flow of the oxidant stream between the first and second oxidant flow field ports; and a coolant fluid flow switching device for periodically reversing the direction of flow of the coolant fluid through the at least one coolant passage.

Such an electrochemical fuel cell assembly preferably further comprises a controller for operating the oxidant flow switching device and the coolant fluid flow switching device such that the oxidant stream flows through the fuel cell substantially concurrently with the coolant fluid.

Another embodiment of the apparatus provides a fuel cell array comprising a plurality of electrochemical fuel cell stacks. Each one of the plurality of fuel cell stacks comprises at least one fuel cell assembly. This embodiment further comprises an oxidant stream flow switching device for periodically individually reversing the oxidant stream flow direction within at least one, and preferably each, of the plurality of fuel cell stacks without simultaneously reversing the oxidant stream flow direction in all of the plurality of fuel cell stacks.

In accordance with this embodiment, each one of the at least one fuel cell assembly preferably comprises:

an ion-exchange membrane interposed between a cathode and an anode;

an oxidant flow field associated with the cathode for directing an oxidant stream to the cathode between a first oxidant flow field port and a second oxidant flow field port; and a fuel flow field associated with the anode for directing a fuel stream to the anode between a fuel stream inlet port and a fuel stream outlet port.

The fuel cell array preferably further comprises an oxidant manifold for supplying the oxidant stream to each of the plurality of fuel cell stacks in parallel.

Preferably the fuel cell array further comprises an oxidant stream flow switching device that reverses the oxidant stream flow direction in a staggered sequence so that the oxidant stream flow direction is not reversed simultaneously in any pair of the plurality of fuel cell stacks.

In the alternative, the fuel cell array of further comprises a controller for actuating the oxidant stream flow switching device and controlling the timing for periodically reversing the oxidant stream flow direction in each of the plurality of stacks.

The controller preferably adjusts the timing for periodically reversing the oxidant stream flow direction responsive to a measured operational parameter of the array. For example, the controller may preferably actuate the oxidant stream flow switching device to reverse the oxidant stream flow direction in at least one, and preferably each, of the plurality of fuel cell stacks when the power output of the fuel cell array is below a predetermined threshold value.

The fuel cell array may further comprise a water recycler associated with the first and second oxidant flow field ports of at least one of the plurality of fuel cell stacks. The water recycler releasably captures water from an exhaust oxidant stream and releases at least a portion of the captured water into an oxidant stream upstream of at least one of the plurality of fuel cell stacks. The water recycler preferably comprises a hygroscopic media.

As with a single fuel cell stack, a fuel cell array preferably further comprises a cooling system comprising cooling fluid passages located within the plurality of fuel cell stacks and a cooling fluid flow switching device for periodically reversing the cooling fluid flow direction within the cooling fluid passages. A cooling fluid controller is preferably employed for synchronizing changes in cooling fluid flow direction with changes in oxidant stream flow direction. The cooling fluid controller may be used to control the cooling fluid flow direction so that it is substantially concurrent with the oxidant stream flow direction. In this way, the temperature profile in the oxidant stream generally increases in the flow direction.

In yet another embodiment, a fuel cell array comprises a plurality of electrochemical fuel cell stacks, wherein each one of the plurality of fuel cell stacks comprises at least one fuel cell assembly. The apparatus further comprises a fuel stream flow switching device for periodically individually reversing the flow direction of a fuel stream within at least one, and preferably each, of the plurality of fuel cell stacks without simultaneously reversing the fuel stream flow direction in all of the plurality of fuel cell stacks. In operation, preferably the fuel stream is humidified and is substantially poison-free. In this context, "poisons" are defined as components within a fuel stream that may adversely affect the performance of the anode catalyst. For example, carbon monoxide is a well-known poison for most conventional anode catalysts.

In this embodiment, each one of the at least one fuel cell assembly preferably comprises:

an ion-exchange membrane interposed between a cathode and an anode;

a fuel flow field associated with the anode for directing a fuel stream to the anode between a first fuel flow field port and a second fuel flow field port; and an oxidant flow field associated with the cathode for directing an oxidant stream to the cathode between an oxidant stream inlet port and an oxidant stream outlet port.

Preferably, the fuel stream flow switching device reverses the fuel stream flow direction in a staggered sequence so that the fuel stream flow direction is not reversed simultaneously in any pair of the plurality of fuel cell stacks.

In this embodiment, the fuel cell array preferably further comprises a controller for actuating the fuel stream flow switching device and controlling the timing for periodically reversing the fuel stream flow direction in each of the plurality of stacks. The controller may further adjust the timing for periodically reversing the fuel stream flow direction responsive to a measured operational parameter of the array. For example, the controller may be responsive to an electrical output of the fuel cell array. The controller preferably actuates the fuel stream flow switching device to reverse the fuel stream flow direction in at least one, and preferably each, of the plurality of fuel cell stacks when the power output of the fuel cell array is below a threshold value.

The fuel cell array may further comprise a water recycler associated with the first and second fuel flow field ports of at least one of the plurality of fuel cell stacks. The water recycler releasably captures water from an exhaust oxidant stream and releases at least a portion of the captured water into a fuel stream upstream of at least one of the plurality of fuel cell stacks. In one embodiment, the water recycler comprises a hygroscopic media.

This embodiment of the fuel cell array of claim may additionally comprise a cooling system comprising cooling fluid passages located within the plurality of fuel cell stacks and a cooling fluid flow switching device for periodically reversing the cooling fluid flow direction within the cooling fluid passages. A cooling fluid controller may be employed for synchronizing changes in cooling fluid flow direction with changes in fuel stream flow direction.

DETAILED DESCRIPTION OF PREFERRED EMBODIMENTS

Figure 1:
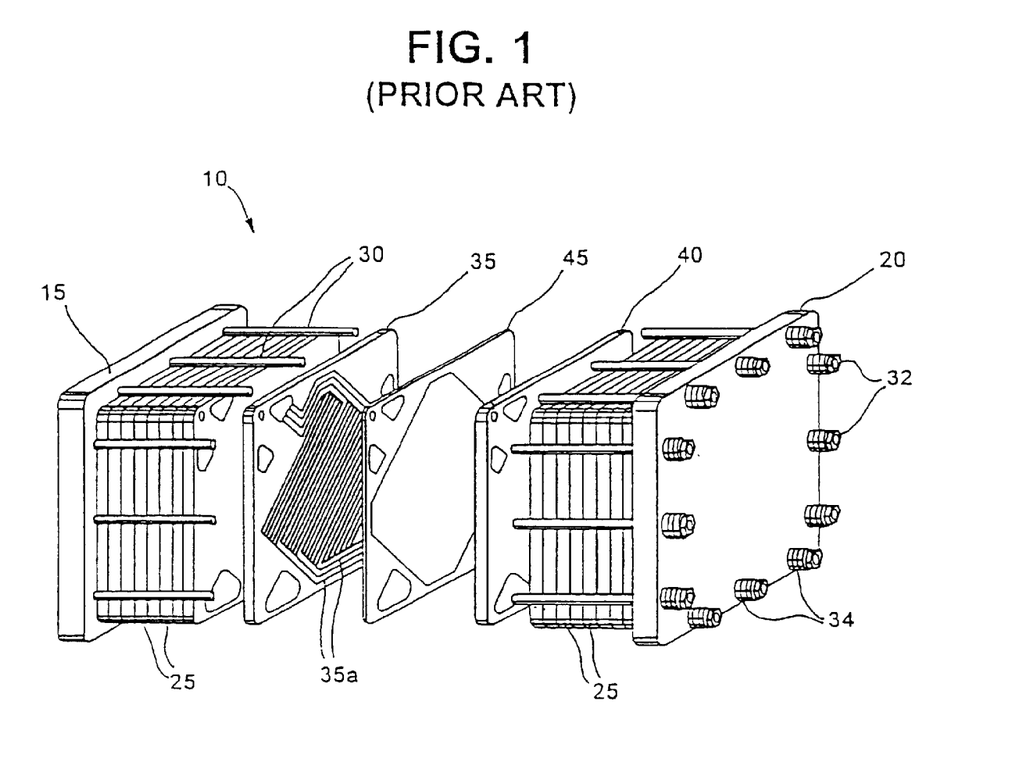
FIG. 1 is an exploded view of a conventional solid polymer electrochemical fuel cell stack.

FIG. 1 illustrates, in exploded view, a conventional (prior art) solid polymer electrochemical fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 disposed on tie rods 30, are interposed between the fastening nuts 32 and the end plate 20 to apply resilient compressive force to the stack in the longitudinal direction. Reactant and coolant fluid streams are supplied to and exhausted from internal manifolds and passages in the stack 10 via stack inlet and outlet ports (not shown) in end plate 15.

A fuel cell array comprises a plurality of fuel cell stacks, with each stack, for example, like the one shown in FIG. 1. Reactant and coolant fluid streams are supplied to and exhausted from the fuel cell assemblies in each fuel cell stack in the array. The reactant streams are preferably supplied to each one of the fuel cell stacks in parallel arrangement with the others. Alternatively, the reactants may be supplied to the fuel cell stacks in series arrangement. However, with a series arrangement, there may be differences in performance between the first and last fuel cell stacks because the reactant stream supplied to the last fuel cell stack will be relatively depleted.

As shown by the exploded portion of FIG. 1, each fuel cell assembly 25 includes an anode flow field plate 35, a cathode flow field plate 40, and a MEA 45 interposed between plates 35 and 40. MEA 45 comprises an ion-exchange membrane interposed between an anode and a cathode. Plate 35 has a plurality of fluid flow channels 35a formed in its major surface facing MEA 45 for directing a reactant stream in contact with one of the electrodes of MEA 45.

Figure 2A:
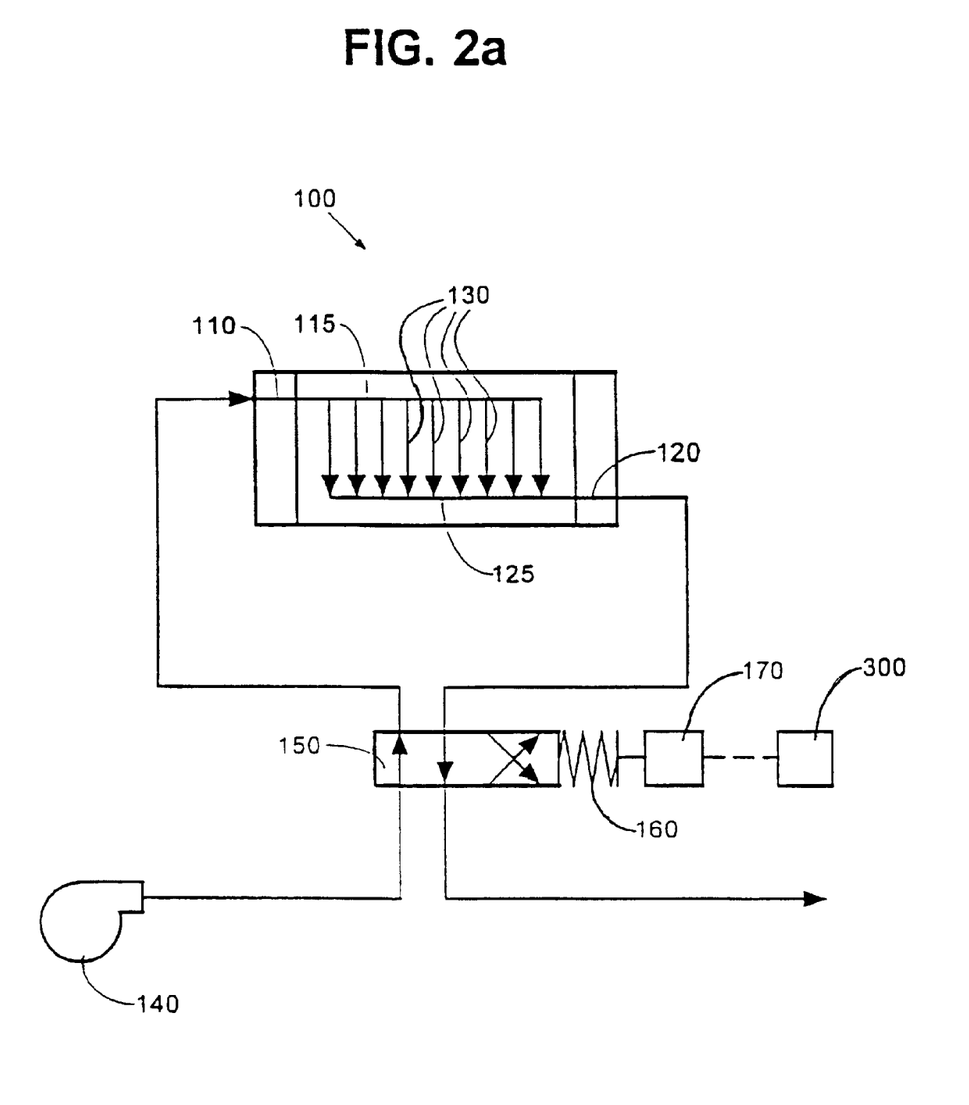
FIGS. 2a and 2b are schematic diagrams of an embodiment of an electrochemical fuel cell assembly comprising a fuel stream flow switching device for reversing the flow direction of the fuel stream through a fuel cell stack.
Figure 2B:
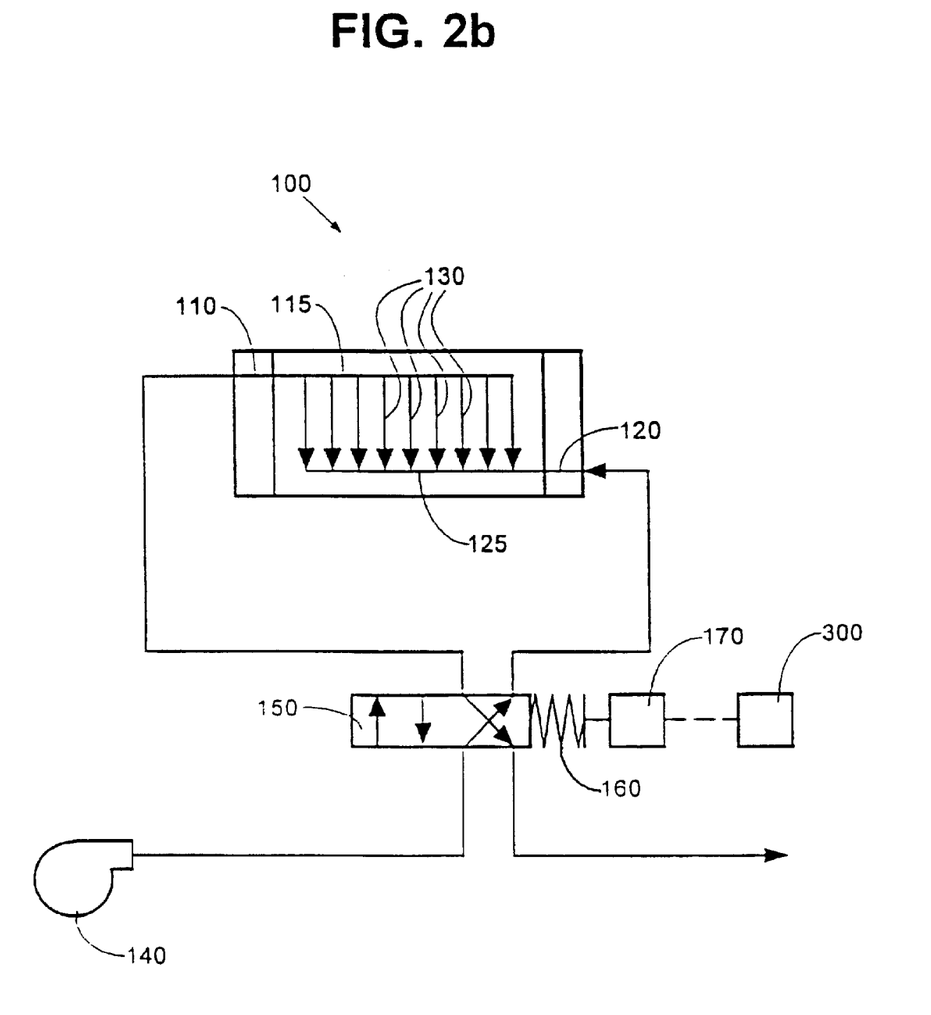

FIGS. 2a and 2b schematically depict an embodiment of an electrochemical fuel cell assembly comprising a fuel stream flow switching device for reversing the flow direction of the fuel stream through a fuel cell stack. A fuel cell stack 100 has two fuel stream ports 110, 120 and associated manifolds 115, 125 for supplying and exhausting a humidified substantially poison-free fuel stream to and from individual fuel cells in stack 100. Lines 130 represent the individual fuel cell fuel flow fields through which the fuel stream is directed to the anodes. In the illustrated embodiment, the fuel flow fields of individual fuel cells of the stack are manifolded in parallel; however, some or all of them may be manifolded in series. Stack 100 also has ports, and manifolds (not shown) for supplying and exhausting an oxidant stream to and from oxidant flow fields of stack 100.

In FIG. 2a, port 110 acts as the fuel stream inlet and manifold 115 supplies the humidified substantially poison-free fuel stream to fuel flow fields 130. Port 120 acts as the outlet for exhausting the fuel stream from flow fields 130 and manifold 125.

Pump 140 supplies a humidified substantially poison-free fuel stream to stack 100 via a fuel stream flow switching device 150. Alternatively, the fuel stream may be supplied from a pressurized source, and instead of using pump 140, a pressure control valve, or flow control valve may be used to regulate the flow of fuel to fuel cell stack 100. The pressurized source may be, for example, a pressurized storage vessel or fuel processing system, or a pressurized supply pipeline from a remote storage facility.

Fuel stream flow switching device 150 controls the directional flow of the fuel stream through stack 100 by controlling which one of ports 110, 120 acts as the fuel stream inlet for flow fields 130.

In FIG. 2a, fuel stream flow switching device 150 is set to direct the fuel stream to the fuel cells via port 110 and exhaust the fuel stream from the fuel cells through port 120. In FIG. 2b, fuel stream flow switching device 150 is set so that port 120 acts as the fuel stream inlet, and port 110 acts as the fuel stream outlet. The arrows on lines 130, represent the direction of fuel stream flow through the individual fuel cell fuel flow fields. Accordingly, the arrows on lines 130 indicate that the fuel stream flow direction through the fuel cell fuel flow fields has reversed from FIG. 2a to FIG. 2b.

In FIGS. 2a and 2b, fuel stream flow switching device 150 is represented by a single component. However, as will be appreciated by those skilled in the art, fuel stream flow switching device 150 may be any device or combination or assembly of components capable of reversing the direction of fluid flow through the fuel flow fields 130. For example, the fuel stream flow switching device 150 may comprise various valves cooperatively operated.

Figure 3:
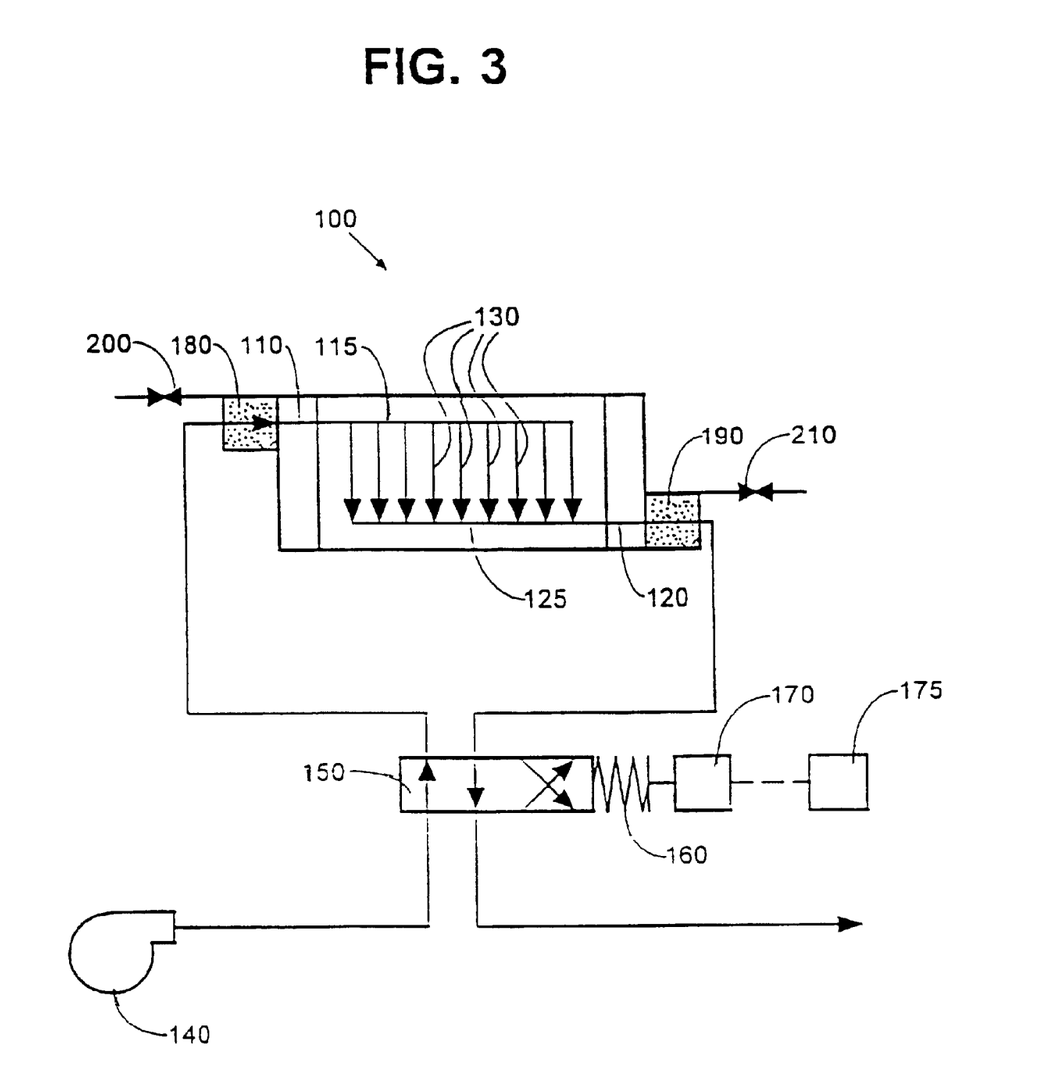
FIG. 3 is a schematic diagram of the embodiment of FIGS. 2a and 2b, further comprising means for reversibly trapping water from the fuel stream.

In FIGS. 2a, 2b and 3, fuel stream flow switching device 150 is schematically depicted as a device with a sliding motion for selecting a setting for controlling the fuel stream flow direction. Any known type of flow switching device or apparatus can be used, for example, one that uses a rotary motion or a pivoting motion.

In FIGS. 2a, 2b and 3, mechanism 160 which actuates fuel stream flow switching device 150 is schematically depicted as a coil spring, compressed in FIG. 2a and FIG. 3, and released in FIG. 2b. Mechanism 160 can be any type of actuator known in the prior art such as a mechanical actuator, electrical actuator, electromagnetic actuator, pneumatic actuator, hydraulic actuator, or hybrid actuator which combines different types of actuators for movements in different directions. To reduce transient effects such as momentary reductions in power output caused by reversing the flow direction of a reactant stream, the flow switching device preferably employs an actuator that can be precisely controlled and quickly actuated.

In the illustrated embodiment, mechanism 160 is part of a controller 170, which periodically causes mechanism 160 to change the setting of fuel stream flow switching device 150. The preferred frequency or time interval with which the flow is reversed by actuating the actuator will vary according to the characteristics of the particular fuel cell, and its operating condition.

For example, characteristics which may affect the preferred frequency include: the size and configuration of the fuel cell flow fields and membrane, the nature of the ion-exchange membrane, the electrode structure, the type of fuel and oxidant streams being used, and the humidity of the fuel stream source.

Preferably, controller 170 causes the fuel stream flow direction to reverse before any portion of the membrane becomes dehydrated.

In one embodiment, shown in FIG. 3, controller 170 uses a timer 175 that is set to cause fuel stream flow direction to reverse at regular time intervals, for example, determined empirically for a given fuel cell. Timer 175 can be set to only take into account elapsed time while the fuel cell is producing electrical power or when compressor 140 is operating.

In a more sophisticated embodiment, a computer 300 is used in conjunction with controller 170 (see FIGS. 2a and 2b). The computer receives data respecting several factors that are used to select a time for actuating fuel stream flow switching device 150. For example, computer 300 may be programmed to cause the fuel stream flow direction to reverse at particular pre-determined intervals or in response to some measured operational parameter or condition, for example, power output or performance of the fuel cell, moisture content in the membrane electrode assembly, temperature, reactant stream pressure, reactant stream humidity, or reactant mass flow rate.

FIG. 3 is a schematic diagram of an embodiment further comprising water recyclers 180, 190 for reversibly capturing water from the exhaust fuel stream and humidifying the fuel stream before it enters stack 100. Water recyclers 180, 190 can be any device that will separate water vapor and/or entrained water droplets from a gaseous stream and impart water vapor to a gaseous stream. Water recyclers 180, 190 are positioned between ports 110, 120 respectively, and the fuel stream flow switching device 150, so that water is removed from the fuel exhaust stream when one of ports 110, 120 is associated with the flow field outlet. When one of ports 110, 120 is associated with the fuel stream inlet, respective water recycler 180, 190 releases the captured water to humidify the fuel stream.

In one embodiment, water recyclers 180, 190 comprise porous hygroscopic media. The porous hygroscopic media is positioned so that the fuel exhaust stream is directed through the media. The media captures water from the humid exhaust fuel stream. Depending upon the length of the time intervals between reversals in fuel stream flow direction, the media will become partly or completely saturated. If the media becomes saturated, then some of the product water may be exhausted from the fuel cell with the fuel exhaust stream (or recycled back to the fuel supply system). When the fuel stream flow direction reverses, the fuel stream is humidified by absorbing water from the media when it passes therethrough.

It is preferred to use media with a high affinity for water to reduce the size of water recyclers 180, 190. Many materials are known to be hygroscopic and some of these materials are widely known as being effective for removing water from a gas. Examples of such materials are adsorbent materials such as: silica gels, and zeolites such as activated carbon or molecular sieves that have high surface areas for collecting water.

It will be apparent to those skilled in the art that a variety of other devices may be used as water recyclers 180, 190. For example, water recyclers 180, 190 may incorporate a cooler to condense water vapor from the exhaust stream, and a vaporizer to re-introduce the condensed water into the fuel stream.

With reference to FIG. 3, water may be provided to water recyclers 180, 190 via valves 200, 210, if there is insufficient water present in the fuel stream. For example, when the fuel cell is being started up, there may not be any captured product water in water recyclers 180, 190. If water recyclers 180, 190 comprise a dry hygroscopic media, the media may adsorb water from the fresh fuel stream, with detrimental effects to the membrane near the oxidant stream inlet; to prevent this from happening, valves 200, 210 may be opened during start-up procedures to moisten the media in water recyclers 180, 190.

The oxidant stream and coolant fluid flow paths are not shown in FIGS. 2a, 2b and 3, but could be illustrated schematically in the same manner as the fuel stream flow path with, or without, a respective flow switching device. If an oxidant stream flow switching device is used, the apparatus preferably further comprises one or more water recyclers for reversibly capturing water from the exhaust oxidant stream and humidifying the oxidant stream before it enters the stack.

Figure 4:
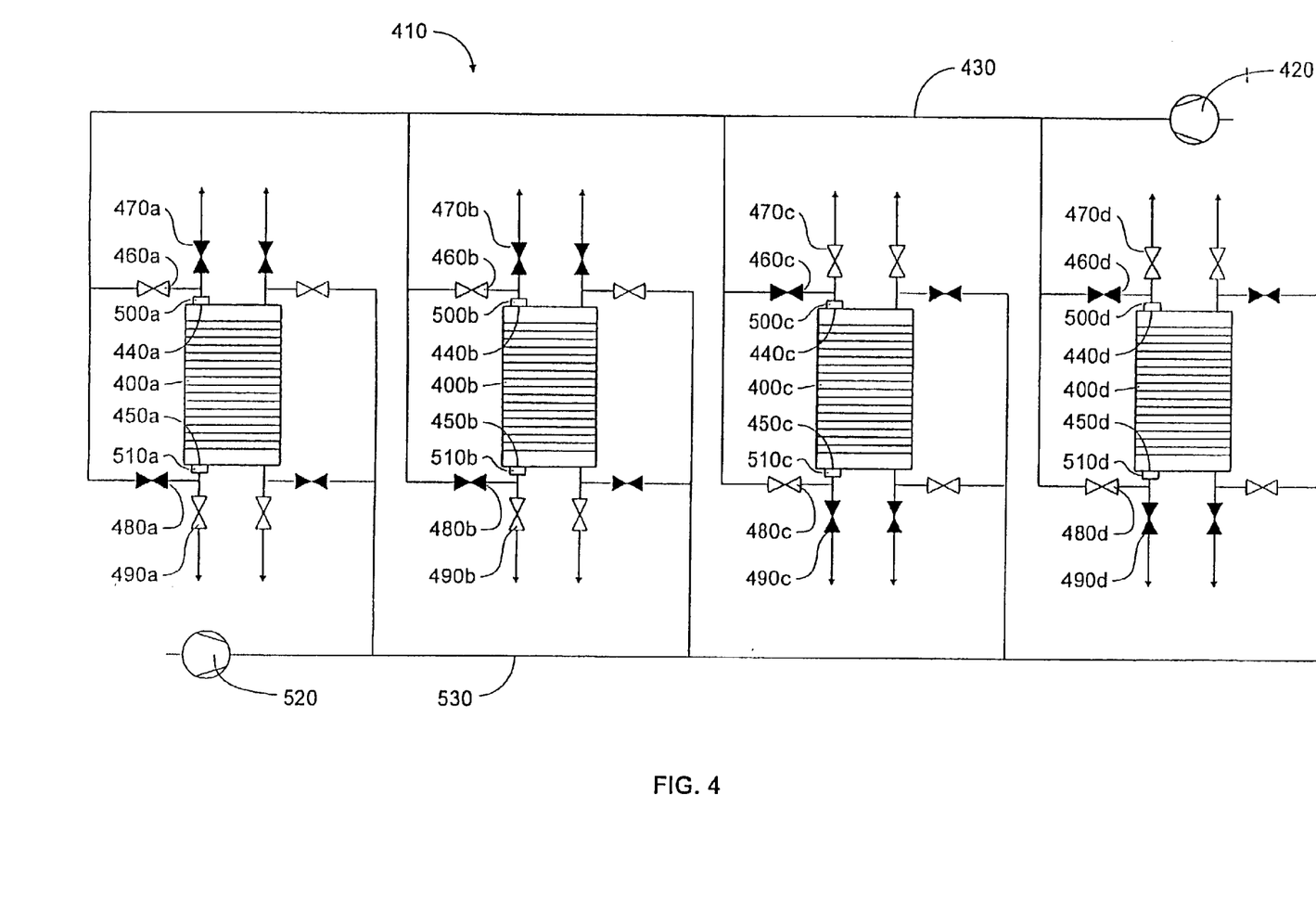
FIG. 4 is a schematic diagram illustrating an embodiment comprising a plurality of fuel cell stacks arranged in an array with a flow switching device for reversing the flow direction of a reactant flowing through at least one fuel cell stack in the array. The flow switching device of FIG. 4 also provides a means for reversing the flow direction in one fuel cell stack independently from the other fuel cell stacks in the array.

FIG. 4 is a schematic diagram that shows four fuel cell stacks 400a, 400b, 400c, and 400d arranged in an array 410. In a preferred arrangement, a flow switching device is employed to periodically reverse the flow direction of an oxidant stream through each one of the plurality of fuel cell stacks 400a–d. In this embodiment, compressor 420 supplies an oxidant stream via manifold 430 to each one of fuel cell stacks 400a–d.

With reference to fuel cell stack 400a, which is also illustrative of stacks 400b–d, ports 440a and 450a are fluidly connected to the oxidant fluid passages within fuel cell stack 400a. Ports 440a and 450a alternate as oxidant stream inlet and outlet ports. In the illustrated embodiment, the oxidant stream flow switching device comprises the oxidant stream supply and exhaust manifolds and valves 460a, 470a, 480a, and 490a which are operable to control the oxidant stream flow direction by determining whether port 440a is an oxidant stream inlet port or an oxidant stream outlet port.

For example, in FIG. 4, valves 460a, 490a, 460b, 490b, 470c, 480c, 470d and 480d are shown as being open (shown in outline), and valves 470a, 480a, 470b, 480b, 460c, 490c, 460d and 490d are shown as being closed (shown solid). With the aforementioned valves in these positions, ports 440a, 440b, 450c, and 450d serve as oxidant stream inlets and ports 450a, 450b, 440c, and 440d serve as oxidant stream outlets. The oxidant stream flow direction in stack 400a may be reversed by closing valves 460a and 490a and opening valves 470a and 480a.

While FIG. 4 illustrates an array comprising four fuel cell stacks 400a–d, it will be understood by those skilled in the art that a similar apparatus and method may be employed by other fuel cell arrays having more or less than four fuel cell stacks, but which also comprise a plurality of fuel cell stacks.

A fuel cell array is supplied with a second reactant stream (fuel stream) and typically an additional coolant fluid stream. FIG. 4 depicts fluid passages for one additional fluid supplied using compressor or pump 520 via manifold 530. For example, if depicted manifold 530 supplies a coolant fluid stream, the valves, as depicted, are configured to direct the coolant fluid to flow through fuel cell stacks 400a–d substantially concurrently with the oxidant stream.

A similar arrangement may be employed for supplying a fuel stream, however, it is then preferable to configure the valves in reverse so that the fuel stream is directed to flow in a direction that is substantially opposite to the oxidant steam.

FIG. 4 also depicts water recyclers 500a–d and 510a–d. When port 450a is serving as an exhaust outlet, recycler 510a separates and captures water vapor and/or entrained water droplets from the exiting oxidant exhaust stream. When port 440a is serving as an inlet, recycler 500a releases previously captured water as vapor into the relatively dry fresh oxidant stream.

In fuel cell array 410, the flow direction of an oxidant stream through individual fuel cell stacks is preferably periodically sequentially reversed at staggered intervals. In particular, it may be advantageous if the oxidant stream flow reversals for each stack are sequenced so that no two stacks are experiencing oxidant stream flow reversal at the same moment. Sequencing the oxidant stream flow reversals helps to reduce fluctuations in power output which are associated with reversing the oxidant stream flow direction.

Several advantages may be realized by implementing the present method and/or apparatus, including the following:

- ability to reduce oxidant and/or fuel stoichiometry at a given performance level because of improved product water management within the fuel cell;
- reduction in parasitic loads because of reductions in reactant flow requirements;
- the apparatus may simplify fuel cell system complexity by reducing or eliminating the need for humidifiers to humidify one or both reactant streams, and product water management components, including condensers, water separators, product water reservoirs, pumps, filters, and all associated piping and fittings;
- system cost and weight may be reduced by the elimination of humidifiers and product water management components;
- elimination of condensers also reduces the need for low temperature coolants which means that it may be possible to operate the cooling system at a higher temperature;
- improved operating efficiency because less power may be required to operate humidifiers or equivalent equipment; and
- apparatus for carrying out the method may be added to conventional fuel cells and stacks, without requiring disassembly or modification of the stack.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A method of distributing water in an array comprising a plurality of electrochemical fuel cell stacks, wherein said plurality of fuel cell stacks each comprise at least one fuel cell assembly comprising an ion-exchange membrane interposed between a cathode and an anode, said method comprising utilizing water accumulating in an oxidant stream flowing through said plurality of fuel cell stacks by periodically reversing the oxidant stream flow direction within oxidant passages within at least one of said plurality of fuel cell stacks.

2. The method of claim 1 further comprising controlling the temperature profile within said oxidant stream so that oxidant stream temperature generally increases in the flow direction.

3. The method of claim 2 comprising periodically reversing the flow direction of a coolant fluid flowing through each of said plurality of fuel cell stacks.

4. The method of claim 1 further comprising periodically reversing the flow direction of a fuel stream flowing through said plurality of fuel cell stacks to prevent said fuel stream flow direction from being substantially concurrent with said oxidant stream flow direction.

5. The method of claim 4 wherein said fuel stream is directed to flow in a direction substantially opposite to the oxidant stream flow direction within said fuel cell assemblies.

6. The method of claim 1 further comprising releasably capturing water from said oxidant stream downstream of at least one of said plurality of fuel cell stacks, and releasing at least a portion of said captured water into said oxidant stream upstream of at least one of said plurality of fuel cell stacks.

7. A method of distributing water in an array comprising a plurality of electrochemical fuel cell stacks, wherein said plurality of fuel cell stacks each comprise at least one fuel cell assembly comprising an ion-exchange membrane interposed between a cathode and an anode, said method comprising utilizing water in a fuel stream flowing through said plurality of fuel cell stacks by periodically reversing the fuel stream flow direction within fuel passages within at least one of said plurality of fuel cell stacks.

8. The method of claim 7 further comprising periodically reversing the flow direction of a coolant fluid flowing through each of said plurality of fuel cell stacks.

9. A method of distributing water to an ion-exchange membrane in an electrochemical fuel cell utilizing water in a substantially poison-free fuel stream, said method comprising periodically reversing the direction of flow of said fuel stream through said fuel cell.

10. The method of claim 9 further comprising periodically reversing the flow direction of a coolant fluid flowing through said fuel cell.

11. A method for distributing water to an ion-exchange membrane in an electrochemical fuel cell utilizing water accumulating in an oxidant stream in an oxidant flow field associated with a cathode of said fuel cell, said method comprising:

periodically reversing the flow direction of said oxidant stream through said oxidant flow field; and controlling the temperature profile within said oxidant stream so that oxidant stream temperature generally increases in the flow direction.

12. The method of claim 11 comprising periodically reversing the flow direction of a coolant fluid flowing through said fuel cell.

13. An electrochemical fuel cell assembly comprising an ion-exchange membrane interposed between a cathode and an anode, said assembly further comprising:

an oxidant flow field associated with said cathode for directing an oxidant stream to said cathode between a first oxidant flow field port and a second oxidant flow field port;

a fuel flow field associated with said anode for directing a fuel stream to said anode between a fuel stream inlet port and a fuel stream outlet port;

a coolant system comprising at least one coolant passage associated with said fuel cell for receiving a coolant fluid which flows through said at least one coolant passage;

an oxidant stream flow switching device for periodically reversing the direction of flow of said oxidant stream between said first and second oxidant flow field ports; and a coolant fluid flow switching device for periodically reversing the direction of flow of said coolant fluid through said at least one coolant passage.

14. The electrochemical fuel cell assembly of claim 13 further comprising a controller for operating said oxidant flow switching device and said coolant fluid flow switching device such that said oxidant stream flows through said fuel cell substantially concurrently with said coolant fluid.

* * * * *